April 27, 1948.    J. C. FERGUSON    2,440,465
RECTIFIER CIRCUIT FREQUENCY MULTIPLIER
Filed Sept. 4, 1944    3 Sheets-Sheet 1
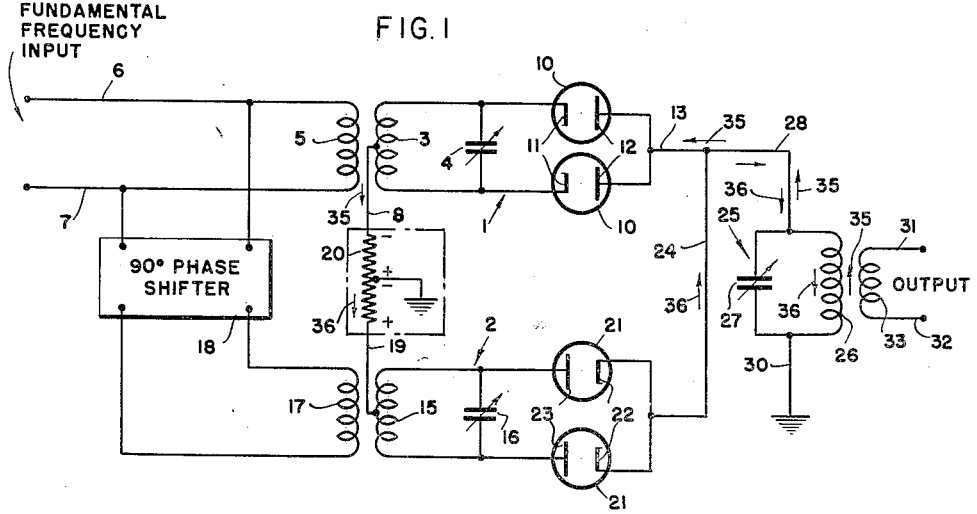
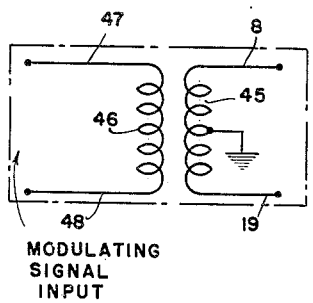
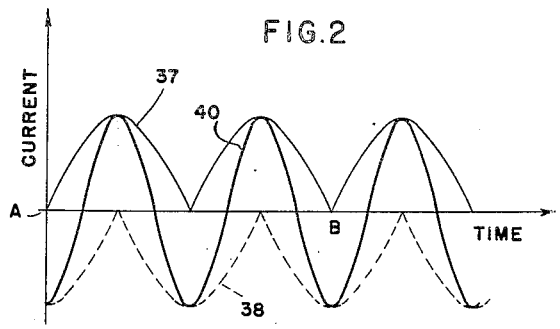
INVENTOR
JOSEPH C. FERGUSON
BY
ATTORNEY

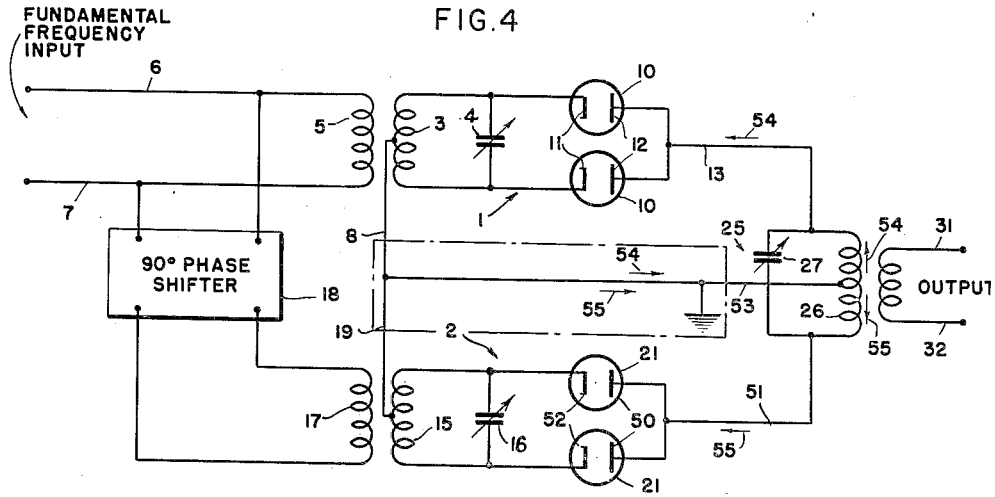
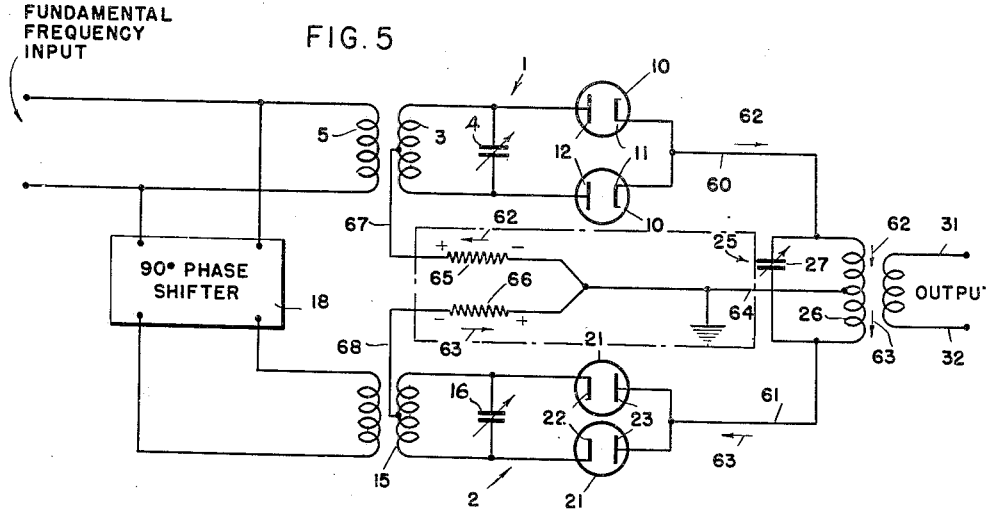

April 27, 1948.   J. C. FERGUSON   2,440,465
RECTIFIER CIRCUIT FREQUENCY MULTIPLIER
Filed Sept. 4, 1944   3 Sheets-Sheet 3
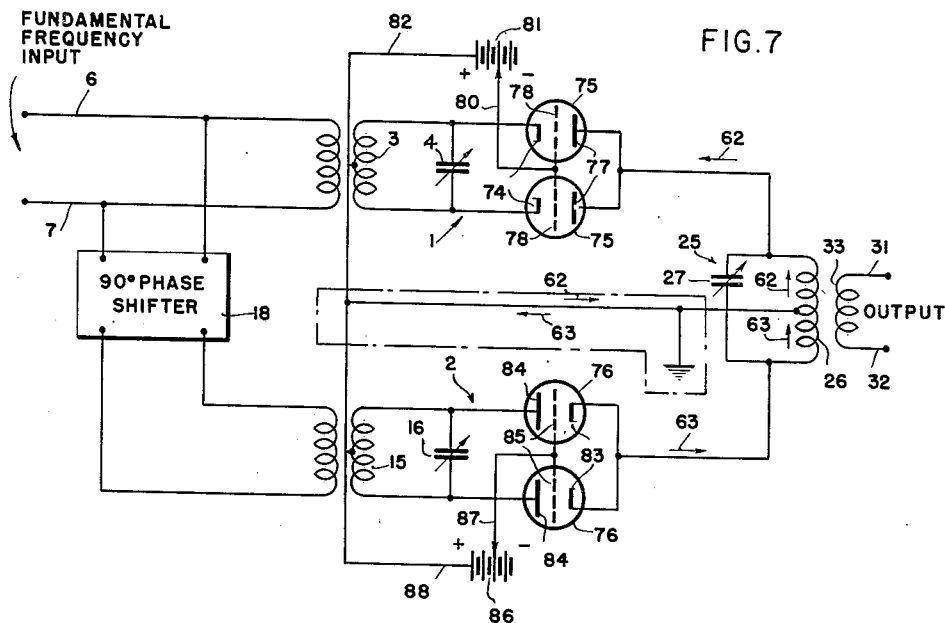
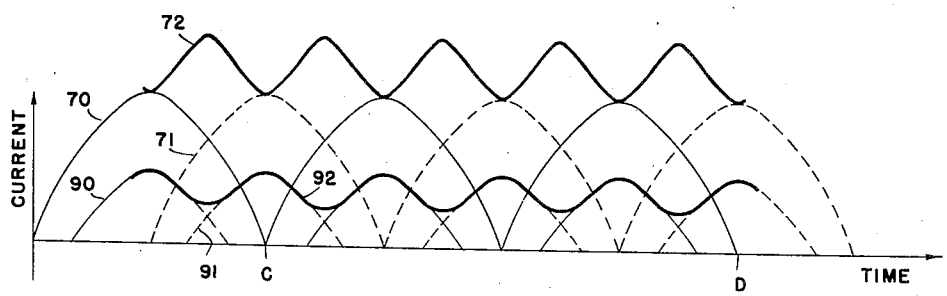
INVENTOR
JOSEPH C. FERGUSON
BY
ATTORNEY Patented Apr. 27, 1948

2,440,465

UNITED STATES PATENT OFFICE 2,440,465

RECTIFIER CIRCUIT FREQUENCY MULTIPLIER

Joseph C. Ferguson, Fort Wayne, Ind., assignor, by mesne assignments, to Farnsworth Research Corporation, a corporation of Indiana Application September 4, 1944, Serial No. 552,650

12 Claims. (Cl. 250—36)

This invention relates to frequency multipliers and particularly to electric full wave rectifier circuits for multiplying a fundamental alternating current frequency.

It is frequently desirable to obtain output energy at the second or a higher harmonic of a fundamental frequency input energy. To this end rectifier circuits have been used with advantage. When it is desired to multiply a fundamental frequency, important considerations are simplicity of the electric circuit used for such frequency multiplication and a high efficiency of the output energy with respect to the input energy. In electric rectifier circuits, particularly of the full wave rectifier type arranged for obtaining an even harmonic of the fundamental frequency, the output signal usually contains a direct current component which is not desired and which, therefore, reduces the efficiency of the circuit. It is often required to modulate the multiplied output signal or to provide means for electrically controlling the amplitude of the output signal. This can be effected conveniently by controlling or modulating the biasing voltage applied to the grid of a thermionic tube such as a triode. In accordance with the invention the operating angle of the rectifier units can also be controlled to effect modulation or amplification without employing triodes.

It is an object of the present invention, therefore, to provide an electric full wave rectifier circuit for deriving output energy at an even harmonic of a fundamental frequency which does not include a direct current component.

A further object of this invention is to provide means in an electric rectifier circuit for controlling or modulating the operating angle during which current is passed through the rectifier units of the circuit, thereby to control or to modulate the amplitude of the output energy obtained at a harmonic of the fundamental frequency.

In accordance with the invention there is provided an electric circuit for multiplying a fundamental frequency which includes a source for supplying the fundamental alternating current frequency. Two circuits are provided each including a full wave rectifier system. One of the circuits is coupled to the fundamental frequency source, while the second circuit is coupled to the fundamental frequency source through a 90 degree phase shifter. An output resonant circuit is tuned to a harmonic of the fundamental frequency and connected to the output of the two rectifier systems. The output signal is derived from this output circuit.

In accordance with another embodiment of the invention means are provided in the two circuits including the rectifier systems for applying a biasing voltage thereto by means of which the operating angle of the rectifier systems is controlled. Instead of applying a biasing voltage a modulating voltage of variable amplitude may be applied to the rectifier systems. In this manner amplitude modulation of the output signal may be effected.

For a better understanding of the invention, together with other and further objects thereof, reference is made to the following description, taken in connection with the accompanying drawings, and its scope will be pointed out in the appended claims.

In the accompanying drawings:

Fig. 1 is a schematic circuit diagram of a frequency multiplier in accordance with the present invention arranged for frequency doubling;

Fig. 2 is a graph representing the output current and its constituent components obtained with the frequency multiplier of Fig. 1;

Fig. 3 is a schematic diagram of a circuit for obtaining amplitude modulation of the output signal;

Fig. 4 is a schematic circuit diagram of another frequency multiplier of the invention also arranged for frequency doubling;

Fig. 5 is a schematic circuit diagram of a modified frequency multiplier embodying the invention and arranged for frequency quadrupling;

Fig. 6 is a graph representing the output current and its constituent components obtained with the frequency multiplier of Fig. 5; and Fig. 7 is a schematic circuit diagram of another embodiment of the invention arranged for frequency quadrupling and including means for controlling or modulating the amplitude of the output signal.

Referring now particularly to Fig. 1, there is provided an electric circuit arranged for frequency doubling and including two resonant full wave rectifier circuits 1 and 2. Resonant circuit 1 includes coil 3 and variable condenser 4 by means of which the circuit is tuned to the fundamental frequency. The fundamental frequency is impressed upon coil 3 through coil 5 shunted across input terminals 6 and 7. Input terminals 6 and 7 are connected with a source for supplying a fundamental alternating current input signal frequency. The center tap on coil 3 is connected to ground through lead 8 and a portion of resistor 20.

Resonant circuit 1 further includes two rectifier units 10, 10 arranged in parallel. Rectifier units 10 may be diodes of the high-vacuum thermionic type or of the thermionic gas type. Instead of thermionic diodes mercury-arc rectifiers or barrier-layer rectifiers may be used. The choice of the particular type of rectifier to be used depends partly upon the operating frequency of the circuit. The rectifier units shown in the drawings are of the thermionic type. Each diode 10 has a cathode 11 and an anode 12. Resonant circuit 1 including diodes 10 functions as a full wave rectifier and its output obtained from lead 13 is a unidirectional current pulsating at twice the frequency of the alternating input current.

Resonant circuit 2 is substantially identical with resonant circuit 1 and includes coil 15 and variable condenser 16 arranged in parallel. By means of variable condenser 16 resonant circuit 2 is tuned to the fundamental frequency. The input signal is impressed upon coil 15 through coil 17 connected with input terminals 6, 7 through phase shifter 18. Phase shifter 18 serves for shifting the phase of the input current signal substantially through 90 degrees. The center tap on coil 15 is connected to ground through lead 19 and a portion of resistor 20. Resistor 20 has its terminals connected to leads 8 and 19 and its center grounded as shown. The purpose of this resistor will be described hereinafter.

Resonant circuit 2 further includes two diodes 21, 21 which may be identical with diodes 10 of resonant circuit 1. Diodes 21 each have a cathode 22 and an anode 23. However, it will be seen that in resonant circuit 2 cathodes 22 are connected with lead 24 from which the output current is derived while in resonant circuit 1 anodes 12 are connected with output lead 13. The output current obtained from resonant circuit 2 is a unidirectional current pulsating at twice the frequency of the fundamental input frequency. However, the output current obtained from lead 24 is shifted in phase through 90 degrees with respect to the output current obtained through lead 13.

Resonant circuit 25 comprises coil 26 and variable condenser 27 arranged in parallel. Resonant circuit 25 is tuned to the second harmonic of the fundamental frequency by means of variable condenser 27. Lead 28, connected with leads 13 and 24, connects the combined output from diodes 10 and 21 to resonant circuit 25. The opposite end of resonant circuit 25 is grounded through lead 30.

The output signal at the second harmonic of the fundamental frequency may be obtained in any convenient and conventional manner. As shown here the output signal is obtained through output terminals 31, 32 connected to coil 33. Coil 33 is inductively coupled to coil 26 of resonant circuit 25.

Referring now to the operation of the frequency multiplier of Fig. 1, it will be seen that the output of diodes 10 and 21 arranged in resonant circuits 1 and 2 each contains a unidirectional current pulsating at twice the frequency of the input signal frequency which may be referred to as the fundamental frequency. The input energy may be either of a continuous sinusoidal character or it may be a modulated signal at a fundamental frequency. The operation of a full wave rectifier circuit such as shown in circuits 1 and 2 is well understood in the art and does not require further explanation here. Whenever one of diodes 10 is conducting, a current will flow in output leads 13 and 28 in the direction indicated by arrows 35. The unidirectional current obtained from the output of diodes 21 of resonant rectifier circuit 2 is shifted in phase through 90 degrees with respect to the output current from diodes 10 due to the action of phase shifter 18. In view of the fact that cathodes 22 of diodes 21 are connected in the opposite sense from cathodes 11 of diodes 10, the output current of diodes 21 obtained from lead 24 has the opposite direction from the one obtained from diodes 10, as indicated by arrows 36. Hence, it will be seen that the two output currents of diodes 10 and 21 of circuits 1 and 2 flow through coil 26 in opposite directions as indicated by arrows 35 and 36.

Referring now to Fig. 2, there has been illustrated by curve 37 the output current of diodes 10 as obtained in lead 28. On the other hand, the output current of diodes 21 as present in lead 28 is represented by curve 38 in Fig. 2. Curve 38 is shifted through 90 degrees in phase with respect to curve 37. Curve 38 has been plotted in the negative sense with respect to curve 37 to indicate that the two currents flow through lead 28 and coil 26 in opposite directions. The difference of the two curves 37 and 38 forming the constituent components of the output current from the two rectifier systems is represented by curve 40 in Fig. 2. One period of the fundamental input frequency is indicated in Fig. 2 by the distance from A to B. Curve 40 is seen to be of double the fundamental frequency of the input signal corresponding to the distance from A to B, and it does not contain a direct current component. It will also be seen that the efficiency of the frequency multiplication is very high.

Resonant circuit 25 is tuned to the second harmonic of the fundamental frequency which is obtained as the difference of the output currents of diodes 10 and 21. Hence, the energy oscillating in circuit 25 at the second harmonic is impressed on coil 33, and an output signal at the second harmonic may be obtained through output terminals 31, 32.

We will now consider the action of resistor 20 on the operation of the electric rectifier circuit just described. A biasing voltage may be applied across resistor 20 for cutting off diodes 10 and 21 at any desired point of their operating cycle to control the angle of conduction or the angle of operation of the diodes. It is also feasible to apply a modulating voltage across resistor 20. In this manner the angle of operation of diodes 10 and 21 may be varied in time. If, at a certain instant, the biasing or modulating voltage applied across resistor 20 has the polarity indicated by the plus and minus signs in Fig. 1, cathodes 11 of diodes 10 will be driven more negative and anodes 23 of diodes 21 more positive. Thus, the angles of operation of diodes 10 and 21 will be increased simultaneously. The effect of changing the angle of operation of diodes 10 and 21 is to reduce or increase the period during which the diodes will conduct current. When, for instance, the angle of operation is reduced, the amplitude of the rectified unidirectional output current is correspondingly reduced which in turn effects a reduction of the amplitude of the output signal. Hence, by applying a modulating voltage across resistor 20 the output signal obtained from terminals 31, 32 may be amplitude modulated.

Instead of employing a resistor for applying the biasing control voltage or a modulating voltage the circuit arrangement shown in Fig. 3 may be used. The circuit of Fig. 3 may be substituted for resistor 20 as indicated by the dotted rectangle in Fig. 1. In Fig. 3 a coil 45 is shown connected to leads 8 and 19 which are identical with the leads bearing the same reference numerals in Fig. 1. The center of coil 45 is connected to ground. The modulating signal is impressed upon coil 45 through coil 46 arranged between input terminals 47, 48. A modulating signal which may be of audio frequency is impressed through terminals 47, 48 upon coil 46. It is of course feasible to omit resistor 20 of Fig. 1 or the circuit arrangement of Fig. 3, in case no control or modulation of the output signal is desired.

Another embodiment of the frequency multiplier of the invention is illustrated in Fig. 4 where like components are designated by the same reference numerals as were used in Fig. 1. The frequency multiplier of Fig. 4 includes resonant circuits 1 and 2 which are substantially the same as shown in Fig. 1. Resonant circuit 1 receives energy at the fundamental frequency through input terminals 6, 7 and coil 5 in the manner described in connection with Fig. 1. Anodes 12 of diodes 10 are connected to output lead 13. Resonant circuit 2 is supplied with energy at the fundamental frequency which is shifted in phase through 90 degrees through the action of phase shifter 18. Diodes 21 of circuit 2 have their anodes 50 connected to output lead 51 while their cathodes 52 are connected to coil 15. Hence, it will be seen that the direction of the direct output current obtained from diodes 10 through lead 13 and the direction of the output current obtained from diodes 21 through lead 51 is the same.

Resonant circuit 25 including coil 26 and variable condenser 27 is connected in series between output leads 13 and 51. The center of coil 26 is connected to ground through lead 53. The direction of the output current of diodes 10 has been indicated by arrows 54 while arrows 55 show the direction of the output current from diodes 21. It will be seen that the output currents represented by arrows 54 and 55 pass from lead 53 through coil 26 in opposite directions.

Accordingly, it will be evident that the operation of the frequency multiplier of Fig. 4 is substantially the same as the one of Fig. 1. Again resonant circuit 25 is tuned to the second harmonic of the fundamental frequency by variable condenser 27, and an output signal at the second harmonic is obtained through output terminals 31, 32. The circuit of Fig. 3 may be substituted for the dotted rectangle of Fig. 4 for effecting modulation of the output signal.

The frequency multiplier illustrated in Fig. 5 is arranged for frequency quadrupling. The frequency multiplier of Fig. 5 includes two resonant circuits 1 and 2 arranged in exactly the same manner as described in connection with Fig. 1. Circuit 1 is supplied with energy at the fundamental frequency through coil 5, and circuit 2 obtains the fundamental alternating current frequency through the 90 degrees phase shifter 18 in the manner referred to in connection with Fig. 1. The output of diodes 10 of circuit 1 is obtained through lead 60 and the output of diodes 21 of circuit 2 through lead 61.

Arrows 62 and 63 indicate, respectively, the direction of the output current of diodes 10 and 21. Resonant circuit 25 including coil 26 and variable condenser 27 is connected in series between leads 60 and 61. The center of coil 26 is connected to ground through lead 64. As shown by arrows 62 and 63 the output current from circuits 1 and 2 flows through coil 26 in the same direction in contra-distinction to the circuit of Fig. 4. This is due to the fact that anodes 12 of diodes 10 and anodes 23 of diodes 21 are arranged in opposite directions resulting in opposite directions of flow of their output currents.

Resistors 65 and 66 are arranged, respectively, in leads 67 and 68 connecting the centers of coils 3 and 15 to ground.

The operation of the frequency multiplier of Fig. 5 can conveniently be explained by reference to Fig. 6. Curve 70 of Fig. 6 indicates the unidirectional rectified current obtained from diodes 10 of circuit 1 and flowing through lead 60 and coil 26. Curve 71 of Fig. 6 represents the output current of diodes 21 of circuit 2 flowing through coil 26 and lead 61 which, as seen, is shifted in phase through 90 degrees. The two currents flow through coil 26 in the same direction, and hence their sum will also be present in coil 26. This current has been shown as curve 72 in Fig. 6. It will be seen that its frequency is four times the one of the fundamental input frequency, the period of which corresponds to the distance from C to D indicated in Fig. 6. Accordingly, resonant circuit 25 is tuned by means of variable condenser 27 to the fourth harmonic of the fundamental frequency which is obtained through terminals 31, 32.

It is evident from Fig. 6 that the efficiency of the frequency quadrupling is comparatively low, and that a large direct current component will be present in the circuit of Fig. 5. However, the direct current component flowing through coil 26 is not impressed upon output coil 33 and, therefore, only the alternating component of current 72 oscillating at the fourth harmonic of the fundamental frequency is obtained from output terminals 31, 32. If we disregard resistors 65 and 66 it will be seen that the direct current resistance of the circuit is comparatively small, being dependent upon the current drop present in diodes 10 and 21 and the direct current resistance of coils 3, 15 and 26. Hence, the losses of the direct current component of the circuit of Fig. 5 can be kept comparatively small because the direct currents flow in a closed path as indicated by arrows 62 and 63. Resistors 65 and 66 could be replaced by the circuit arrangement of Fig. 3 to minimize the direct current resistance of the circuit illustrated in Fig. 5.

Resistors 65 and 66 serve for applying a biasing voltage to diodes 10 and 21. In the same manner as explained in connection with Fig. 1 a modulating voltage may also be applied across resistors 65 and 66 for obtaining amplitude modulation of the output signal obtained from output terminals 31, 32. It is also feasible to substitute the modulating circuit shown schematically in Fig. 3 for the dotted rectangle of Fig. 5 including resistors 65 and 66. It is preferred to modulate the angle of operation so that the mean angle of operation is different from 180 degrees, and may, for instance, be equal to 120 degrees. However, instead of 120 degrees any other value may be chosen for the mean operating angle as long as the mean operating angle is between 90 and 180 degrees.

The effect of reducing the operating angle of diodes 10 and 21 to 120 degrees has been illustrated in Fig. 6. Curve 90 shows the output current of diodes 10 of circuit 1 when the operating angle of diodes 10 is reduced to 120 degrees. Curve 91 illustrates the output current diodes 21 of circuit 2 under the same condition. The sum of the output currents 90 and 91 is represented by curve 92. It will be seen that the amplitude of curve 92 is much smaller than that of curve 72 and thus amplitude modulation of the output signal is achieved.

It is to be understood that the modulating or control voltage applied to resistor 20 of Fig. 1 or to coil 45 of Fig. 3 or to resistors 65 and 66 of Fig. 5 may be obtained in any convenient manner known to the art. The main principle is to apply a controllable or variable, that is, modulating the electromotive force for controlling or modulating the angle of operation of the diodes forming part of the two full wave rectifier circuits.

From the previous explanation it will be evident that the fourth harmonic of the fundamental frequency may also be obtained by arranging diodes 10 and 21 in the circuit of Fig. 1 in the same manner as shown in Fig. 4. In that case the output currents flowing in lead 28 of Fig. 1 have the same direction, and hence in coil 26 the sum of the output currents of diodes 10 and 21 appears instead of their difference. Accordingly, output energy at the fourth harmonic of the fundamental frequency is obtained from output terminals 31, 32.

The frequency multiplier of the invention shown in Fig. 7 is essentially identical with the circuit of Fig. 5. The main difference between the circuits of Figs. 5 and 7 is that diodes 10 and 21 of Fig. 5 have been replaced by triodes 75 and 76 in Fig. 7. Resonant circuit 1 again includes coil 3 and variable condenser 4 coupled to input terminals 6 and 7 in the manner described in connection with the previous figures. Circuit 2 includes coil 15 and variable condenser 16 coupled to input circuits 6 and 7 through 90 degrees phase shifter 18. Triodes 75 in resonant circuit 1 each have a cathode 74, an anode 77 and a grid 78. Grids 78 are connected through lead 80 to battery 81 having its positive terminal connected to ground through lead 82. Triodes 76 in resonant circuit 2 each have a cathode 83, an anode 84 and a grid 85. Grids 85 are connected to battery 86 through lead 87. The positive pole of battery 86 is connected to ground through lead 88.

Cathodes 74 of triodes 75 and cathodes 83 of triodes 76 are arranged in opposite directions and hence this circuit functions essentially as the one described in connection with Fig. 5. The output currents indicated by arrows 62 and 63 flow through coil 26 in the same direction. Therefore, the sum of the output currents and hence the fourth harmonic of the fundamental input frequency is present in coil 26. Accordingly, resonant circuit 25 is tuned by means of variable condenser 27 to the fourth harmonic of the fundamental frequency, and the output signal is obtained through output terminals 31, 32.

A biasing voltage obtained from batteries 81 and 86 may be applied to grids 78 and 85, respectively. The biasing voltage may be varied or controlled by changing the taps connecting batteries 81 and 86 to leads 80 and 87, respectively. In this manner the angle of operation of triodes 75, 76 may be controlled or a modulating voltage may be applied to the grids of triodes 75 and 76 for the purpose and in the manner described hereinbefore. A modulating voltage may be applied by the circuit of Fig. 3 which may be substituted for the dotted rectangle shown in Fig. 7. When the voltage applied to grids 78 and 85 is to be modulated, such modulating voltage may be supplied in a conventional manner, for instance, from a thermionic tube, and it should be understood that the voltage supply through the batteries shown in Fig. 7 is a schematic or symbolic representation only.

In Figs. 1, 4, 5 and 7 circuits 1 and 2 have been shown as resonant circuits tunable by variable condensers 4 and 16, respectively, to the frequency of the input signal. It is, however, only necessary to tune circuits 1 and 2 if the input signal is of a high frequency. If the input signal is of a low frequency of, for example, 60 cycles it is no longer necessary to tune circuits 1 and 2 and hence tuning condensers 4 and 16 can be dispensed with. Accordingly, it is to be understood that the rectifier circuit of the invention will be effective to multiply a low frequency as well as a high frequency.

Triodes with extremely low internal voltage drop are desirable in the circuit of Fig. 7, and rectifiers or triodes similar to the mercury vapor RK-100 tube manufactured by Raytheon Manufacturing Company may be used for this purpose. Tubes of this kind will perform satisfactorily at frequencies up to about 100 megacycles. The dissipation rating of the tubes used for the frequency multiplier of the invention need be only that due to the inefficiency of the alternating current voltage input rectification. It is also feasible to employ triodes with positive grid voltage. The only drawback of this type of tube is that the grid dissipation and the added capacities of the tubes would offer some frequency limitation to the frequency multiplier circuit of the invention.

While there has been described what are at present considered the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electric circuit for multiplying a fundamental frequency comprising a source for supplying a fundamental alternating current frequency, a first full wave rectifier circuit including two rectifier units each having a pair of terminals between which there is a current flow, one terminal of each unit being coupled to said source, means for shifting the phase of said fundamental frequency current substantially through 90 degrees, a second full wave rectifier circuit including two rectifier units each having a pair of terminals between which there is a current flow, one terminal of each unit being coupled to said phase shifting means, the remaining terminals of said rectifier units constituting the output of said rectifier circuits, a resonant circuit tuned to a harmonic of said fundamental frequency and connected to said output terminals, said rectifier circuits being arranged in such a manner that a direct current component will flow through said rectifier units in opposite directions with respect to said output terminals, and means for deriving an output signal from said resonant circuit.

2. An electric circuit for multiplying a fundamental frequency comprising a source for supplying a fundamental alternating current frequency, a first circuit including a first full wave rectifier system and an inductance connected to a point of reference potential, said first circuit being coupled to said source, means for shifting the phase of said fundamental frequency current substantially through 90 degrees, a second circuit including a second full wave rectifier system and an inductance connected to said point of reference potential, said second circuit being coupled to said phase shifting means, a resonant circuit tuned to the second harmonic of said fundamental frequency and connected in series between said point of reference potential and the combined output of said rectifier systems, said rectifier systems being arranged with respect to said resonant circuit so that the direct current component of the output of one of said systems flows through said resonant circuit in a direction opposite from the one of the direct current component of the output of the other one of said systems, and means for deriving an output signal at the second harmonic of said fundamental frequency from said resonant circuit.

3. An electric circuit for multiplying a fundamental frequency comprising a source for supplying a fundamental alternating current frequency, a first circuit including a first full wave rectifier system and an inductance connected to a point of reference potential, said first circuit being coupled to said source, means for shifting the phase of said fundamental frequency current substantially through 90 degrees, a second circuit including a second full wave rectifier system and an inductance connected to said point of reference potential, said second circuit being coupled to said phase shifting means, means in said first circuit and in said second circuit for applying a biasing voltage to said rectifier systems to control the operating angle thereof, a resonant circuit tuned to the second harmonic of said fundamental frequency and connected in series between said point of reference potential and the combined output of said rectifier systems, and means for deriving an output signal at the second harmonic of said fundamental frequency from said resonant circuit.

4. An electric circuit for multiplying a fundamental frequency comprising a source for supplying a fundamental alternating current frequency, a first circuit including a first full wave rectifier system and an inductance connected to a point of reference potential, said first circuit being coupled to said source, means for shifting the phase of said fundamental frequency current substantially through 90 degrees, a second circuit including a second full wave rectifier system and an inductance connected to said point of reference potential, said second circuit being coupled to said phase shifting means, means in said first circuit and in said second circuit for applying a modulating voltage of variable amplitude to said rectifier systems to modulate the operating angle thereof, a resonant circuit tuned to the second harmonic of said fundamental frequency and connected in series between said point of reference potential and the combined output of said rectifier systems, and means for deriving an output signal at the second harmonic of said fundamental frequency from said resonant circuit, thereby to amplitude modulate said output signal.

5. An electric circuit for multiplying a fundamental frequency comprising a source for supplying a fundamental alternating current frequency, a first circuit including a first full wave rectifier system and an inductance connected to a point of reference potential, said first circuit being coupled to said source, means for shifting the phase of said fundamental frequency current substantially through 90 degrees, a second circuit including a second full wave rectifier system and an inductance connected to said point of reference potential, said second circuit being coupled to said phase shifting means, a resonant circuit including an inductance connected to said point of reference potential, said resonant circuit being tuned to a harmonic of said fundamental frequency and connected between the outputs of said rectifier systems, said rectifier systems being arranged in such a manner that a direct current component will flow through said rectifier systems in opposite directions with respect to the outputs thereof, and means for deriving an output signal from said resonant circuit.

6. An electric circuit for multiplying a fundamental frequency comprising a source for supplying a fundamental alternating current frequency, a first circuit including a first full wave rectifier system and an inductance connected to a point of reference potential, said first circuit being coupled to said source, means for shifting the phase of said fundamental frequency current substantially through 90 degrees, a second circuit including a second full wave rectifier system and an inductance connected to said point of reference potential, said second circuit being coupled to said phase shifting means, a resonant circuit including an inductance connected to said point of reference potential, said resonant circuit being tuned to the fourth harmonic of said fundamental frequency and connected between the outputs of said rectifier systems, said rectifier systems being arranged with respect to said resonant circuit so that the direct current components of the outputs of said systems flow in the same direction through said resonant circuit with respect to said rectifier systems, and means for deriving an output signal at the fourth harmonic of said fundamental frequency from said resonant circuit.

7. An electric circuit for multiplying a fundamental frequency comprising a source for supplying a fundamental alternating current frequency, a first circuit including a first full wave rectifier system and an inductance connected to a point of reference potential, said first circuit being coupled to said source, means for shifting the phase of said fundamental frequency current substantially through 90 degrees, a second circuit including a second full wave rectifier system and an inductance connected to said point of reference potential, said second circuit being coupled to said phase shifting means, means in said first circuit and in said second circuit for applying a biasing voltage to said rectifier systems to control the operating angle thereof, a resonant circuit including an inductance connected to said point of reference potential, said resonant circuit being tuned to a harmonic of said fundamental frequency and connected between the outputs of said rectifier systems, said rectifier systems being arranged with respect to said resonant circuit so that the direct current components of the outputs of said systems flow in the same direction through said resonant circuit with respect to said rectifier systems, and means for deriving an output signal from said resonant circuit.

8. An electric circuit for multiplying a fundamental frequency comprising a source for supplying a fundamental alternating current frequency, a first circuit including a first full wave rectifier system and an inductance connected to a point of reference potential, said first circuit being coupled to said source, means for shifting the phase of said fundamental frequency current substantially through 90 degrees, a second circuit including a second full wave rectifier system and an inductance connected to said point of reference potential, said second circuit being coupled to said phase shifting means, a resonant circuit including an inductance connected to said point of reference potential, means in said first circuit and in said second circuit for applying a modulating voltage of variable amplitude to said rectifier systems to modulate the operating angle thereof, said resonant circuit being tuned to a harmonic of said fundamental frequency and connected between the outputs of said rectifier systems, said rectifier systems being arranged with respect to said resonant circuit so that the direct current components of the outputs of said systems flow in the same direction through said resonant circuit with respect to said rectifier systems, and means for deriving an output signal from said resonant circuit, thereby to amplitude modulate said output signal.

9. An electric circuit for multiplying a fundamental frequency comprising a source for supplying a fundamental alternating current frequency, a first full wave rectifier circuit coupled to said source, means for shifting the phase of said fundamental frequency current substantially through 90 degrees, a second full wave rectifier circuit coupled to said phase shifting means, each of said circuits having an output terminal, a resonant circuit tuned to a harmonic of said fundamental frequency and coupled to said output terminals, said rectifier circuits being arranged in such a manner that a direct current component will flow through said rectifier circuits in opposite directions with respect to said output terminals, and means for deriving an output signal at a harmonic of said fundamental frequency from said resonant circuit.

10. An electric circuit for multiplying a fundamental frequency comprising a source for supplying a fundamental alternating current frequency, a first full wave rectifier circuit coupled to said source, means for shifting the phase of said fundamental frequency current substantially through 90 degrees, a second full wave rectifier circuit coupled to said phase shifting means, each of said circuits having an output terminal, a resonant circuit tuned to the fourth harmonic of said fundamental frequency and connected between the output terminals of said rectifier circuts, said rectifier circuits being arranged in such a manner that a direct current component will flow through said rectifier circuits in opposite directions with respect to said output terminals, and means for deriving an output signal at the fourth harmonic of said fundamental frequency from said resonant circuit.

11. An electric circuit for multiplying a fundamental frequency comprising a source for supplying a fundamental alternating current frequency, a first circuit including a first full wave rectifier system comprising a pair of triodes, each having a grid, a cathode and an anode, the cathodes of the triodes of said first circuit being coupled to said source, means for shifting the phase of said fundamental frequency current substantially through 90 degrees, a second circuit including a second full wave rectifier system comprising a pair of triodes, each having a grid, a cathode and an anode, the anodes of the triodes of said second circuit being coupled to said phase shifting means, means for applying a biasing voltage to said grids to control the operating angle of said triodes, a resonant circuit tuned to a harmonic of said fundamental frequency and coupled to the output of said rectifier systems, and means for deriving an output signal from said resonant circuit.

12. An electric circuit for multiplying a fundamental frequency comprising a source for supplying a fundamental alternating current frequency, a first circuit including a first full wave rectifier system and an inductance connected to a point of reference potential, said first rectifier system including a pair of triodes, each having a grid, a cathode and an anode, the cathodes of the triodes of said first circuit being coupled to said source, means for shifting the phase of said fundamental frequency current substantially through 90 degrees, a second circuit including a second full wave rectifier system and an inductance connected to said point of reference potential, said second rectifier system including a pair of triodes, each having a grid, a cathode and an anode, the anodes of the triodes of said second circuit being coupled to said phase shifting means, means for applying a biasing voltage to said grids to control the operating angle of said triodes, a resonant circuit including an inductance connected to said point of reference potential, said resonant circuit being tuned to a harmonic of said fundamental frequency and connected between the outputs of said rectifier systems, and means for deriving an output signal from said resonant circuit.

JOSEPH C. FERGUSON.

REFERENCES CITED

The following references are of record in the file of this patent:

UNITED STATES PATENTS

| Number | Name | Date |
|---|---|---|
| 1,988,097 | Von Arco | Jan. 15, 1935 |
| 2,190,731 | Posthumus | Feb. 20, 1940 |
| 2,253,575 | Norton | Aug. 26, 1941 |
| 2,323,672 | Nelson | July 6, 1943 |

FOREIGN PATENTS

| Number | Country | Date |
|---|---|---|
| 435,201 | Great Britain | Sept. 17, 1935 |